(12) United States Patent
Tambo et al.

(10) Patent No.: US 12,482,834 B2
(45) Date of Patent: Nov. 25, 2025

(54) FUEL CELL BIPOLAR PLATE DESIGN FOR REDUCED CORROSION POTENTIAL

(71) Applicant: Toyota Motor Engineering & Manufacturing North America, Inc., Plano, TX (US)

(72) Inventors: Tomoki Tambo, Ann Arbor, MI (US); Ercan Dede, Ann Arbor, MI (US); Yuqing Zhou, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 622 days.

(21) Appl. No.: 17/877,513

(22) Filed: Jul. 29, 2022

(65) Prior Publication Data
US 2024/0039016 A1    Feb. 1, 2024

(51) Int. Cl.
*H01M 8/04029* (2016.01)
*H01M 8/2485* (2016.01)

(52) U.S. Cl.
CPC ..... *H01M 8/04029* (2013.01); *H01M 8/2485* (2013.01)

(58) Field of Classification Search
CPC .......................... H01M 8/04029; H01M 8/2485
See application file for complete search history.

(56) References Cited

U.S. PATENT DOCUMENTS

| | | | |
|---|---|---|---|
| 7,998,631 B2 | 8/2011 | Elhamid et al. | |
| 9,012,104 B2 | 4/2015 | Peled et al. | |
| 9,444,105 B2 | 9/2016 | Friesen et al. | |
| 9,653,746 B2 | 5/2017 | Jin et al. | |
| 11,005,117 B2 | 5/2021 | Seymour et al. | |
| 2024/0243303 A1* | 7/2024 | Ranieri | H01M 8/241 |

OTHER PUBLICATIONS

Suresh P.V., et al., "An improved serpentine flow field with enhanced cross-flow for fuel cell applications", International Journal of Hydrogen Energy, vol. 36, Issue 10, May 2011, pp. 6067-6072.
Gundlapalli, Ravendra et al., "Effective splitting of serpentine flow field for applications in large-scale flow batteries", Journal of Power Sources 487 (2021) 229409, 11 pages.

* cited by examiner

*Primary Examiner* — Olatunji A Godo
(74) *Attorney, Agent, or Firm* — Jordan IP Law, LLC

(57) ABSTRACT

A fuel cell system includes: a first fuel cell; a second fuel cell; a cathode configured to receive a positive charge from the first fuel cell and the second fuel cell; an anode disposed apart from the cathode and configured to receive a negative charge from the first fuel cell and the second fuel cell; a manifold enclosing the anode and the cathode; coolant disposed within the manifold and surrounding the cathode and the anode; and a seal disposed between the cathode and the anode so as to prevent the coolant from leaking into the first fuel cell, wherein the cathode includes a seal portion disposed adjacent to the seal and a remaining portion separated from the seal by the seal portion, and wherein the remaining portion of the cathode is configured to be non-parallel with the anode so as to reduce shunt current at the seal portion.

16 Claims, 12 Drawing Sheets

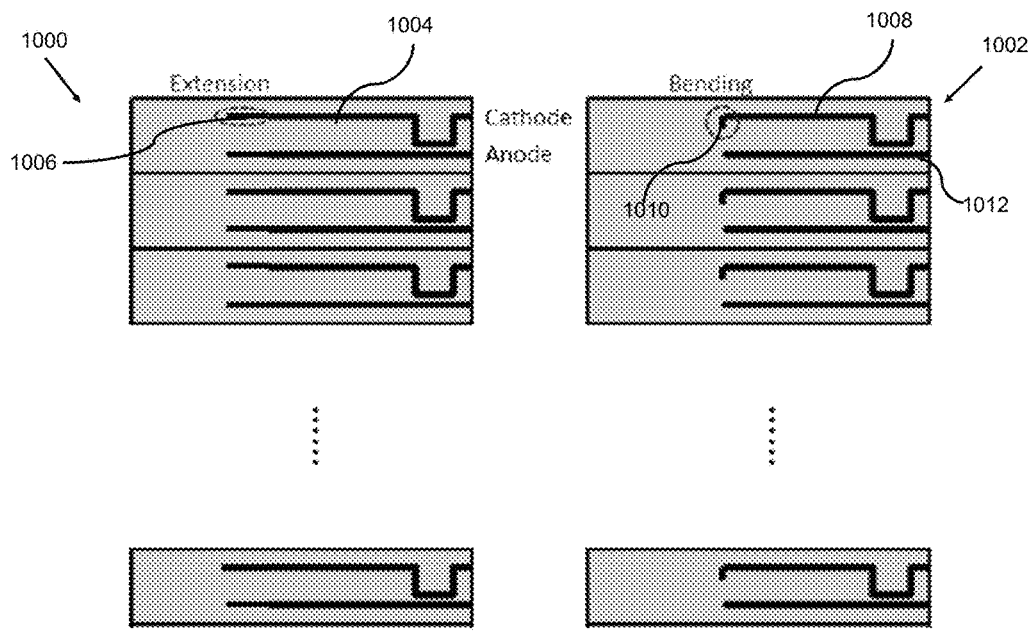
FIG. 10A    FIG. 10B
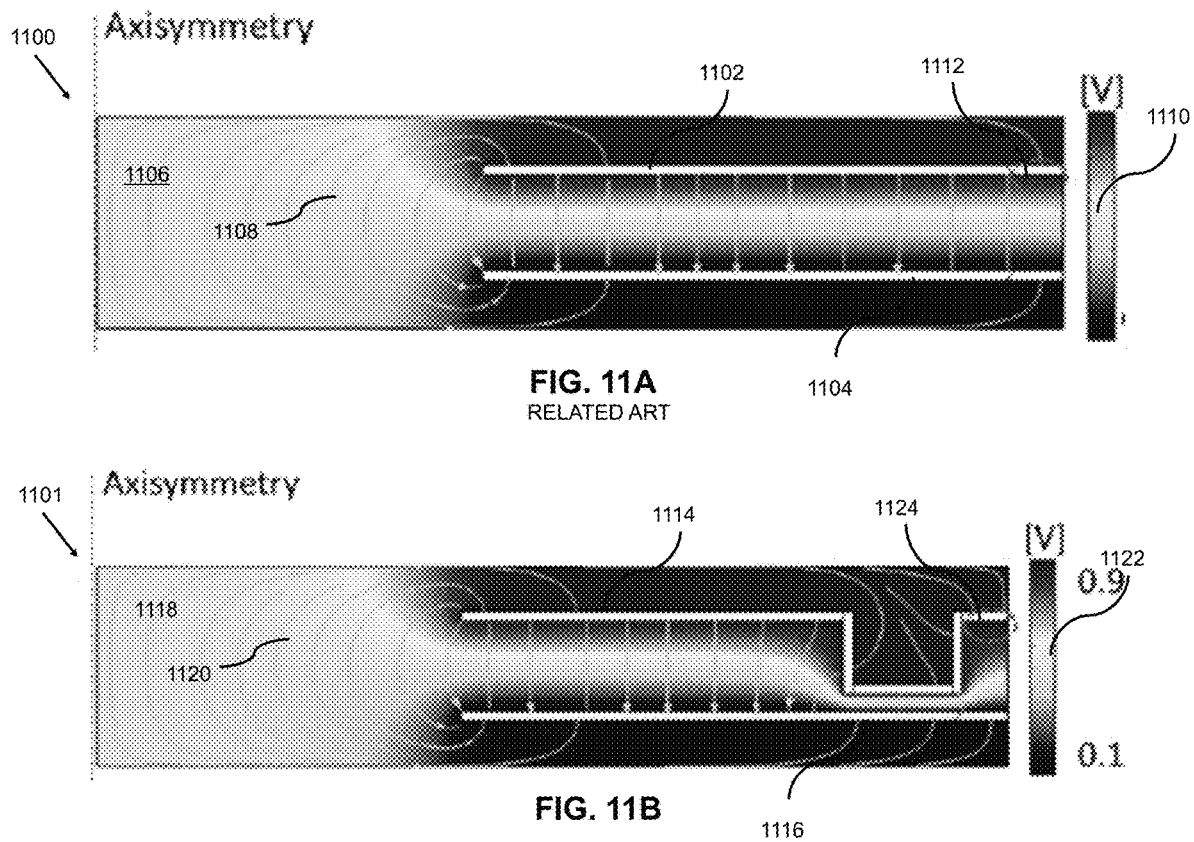
FIG. 11A
RELATED ART
FIG. 11B

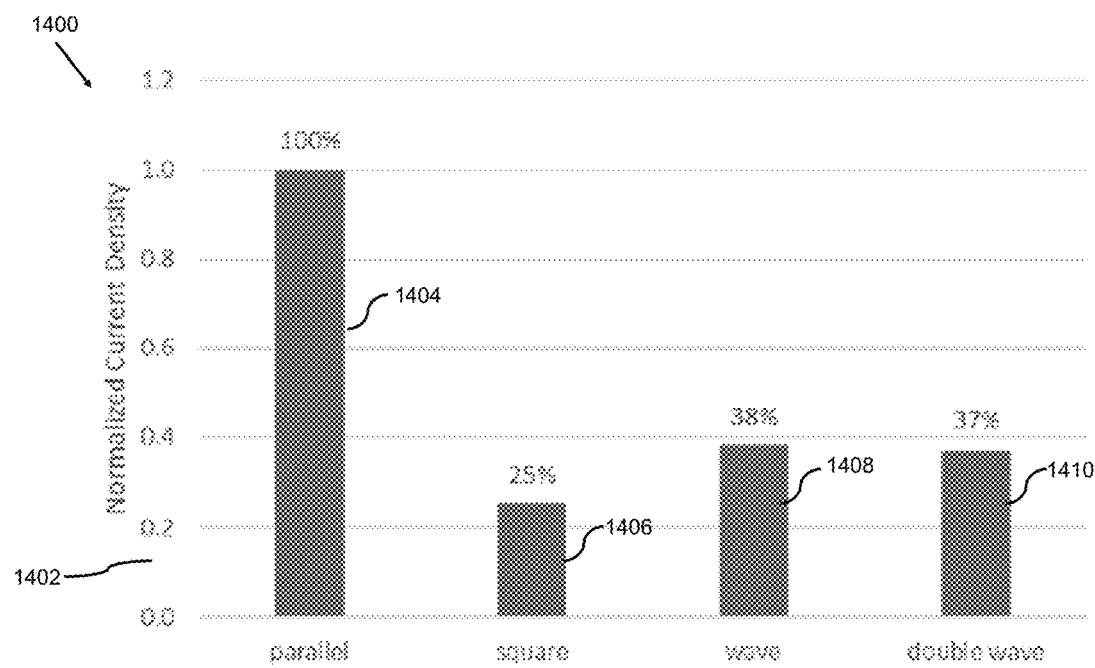
FIG. 14
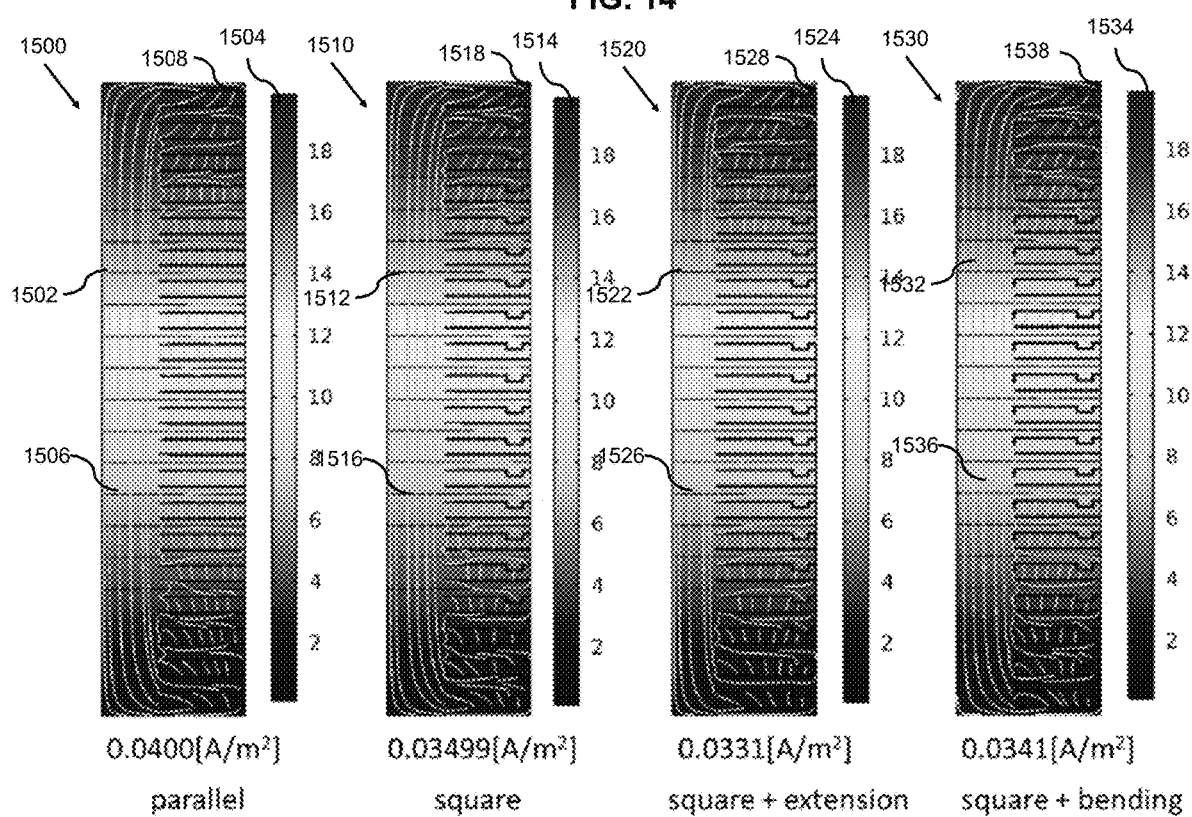
| 0.0400[A/m²] | 0.03499[A/m²] | 0.0331[A/m²] | 0.0341[A/m²] |
| parallel | square | square + extension | square + bending |
| FIG. 15A<br>RELATED ART | FIG. 15B | FIG. 15C | FIG. 15D |

FUEL CELL BIPOLAR PLATE DESIGN FOR REDUCED CORROSION POTENTIAL

TECHNICAL FIELD

One or more embodiments relate generally to fuel cell systems.

BACKGROUND

There is a shifting from fossil fuels to renewable energy as an alternative for industrial purposes, household purposes, vehicles, and small electronic products such as portable devices. Accordingly, there is active research and development on fuel cells. A fuel cell is a generator that converts chemical energy of a fuel into electrical energy through an electrochemical reaction.

A problem with a fuel cell is corrosion of electrodes that result gas leak in the fuel cell.

SUMMARY

An aspect of the present disclosure is drawn to a fuel cell system including: a first fuel cell; a second fuel cell electrically connected in series with the first fuel cell; a cathode configured to receive a positive charge from the first fuel cell and the second fuel cell; an anode disposed apart from the cathode and configured to receive a negative charge from the first fuel cell and the second fuel cell; a manifold enclosing the anode and the cathode; coolant disposed within the manifold and surrounding the cathode and the anode; and a seal disposed between the cathode and the anode so as to prevent the coolant from leaking into the first fuel cell, wherein the cathode includes a seal portion disposed adjacent to the seal and a remaining portion separated from the seal by the seal portion, and wherein the remaining portion of the cathode is configured to be non-parallel with the anode so as to reduce shunt current at the seal portion.

In some embodiments of this aspect, the remaining portion of the cathode includes a parallel portion that is parallel with the anode and a rising step portion that is not parallel with the anode. In some of these embodiments, the parallel portion is disposed a first distance from the anode and the rising step portion is disposed at a second distance from the anode, the first distance is greater than the second distance, and the rising step portion connects the parallel portion with the seal portion.

In some embodiments of this aspect, the remaining portion of the cathode is curved such that at least one portion of the remaining portion is disposed a first distance from the anode and the seal portion is disposed at a second distance from the anode, and the first distance is less than the second distance.

In some embodiments of this aspect, the anode includes an anode seal portion disposed adjacent to the seal and an anode remaining portion separated from the seal by the anode seal portion, and the remaining portion of the cathode is configured to be non-parallel with the anode remaining portion.

In some embodiments of this aspect, the remaining portion of the cathode includes an end that is bent toward the anode.

Another aspect of the present disclosure is drawn to a method of making a fuel cell system. The method includes: forming a first fuel cell; forming a second fuel cell electrically connected in series with the first fuel cell; forming a cathode configured to receive a positive charge from the first fuel cell and the second fuel cell; forming an anode disposed apart from the cathode and configured to receive a negative charge from the first fuel cell and the second fuel cell; forming a seal between the cathode and the anode; enclosing the anode and the cathode with a manifold; and disposing coolant within the manifold and so as to surround the cathode and the anode, wherein the seal prevents the coolant from leaking into the first fuel cell, wherein the forming the cathode includes forming the cathode so as to include a seal portion disposed adjacent to the seal and a remaining portion separated from the seal by the seal portion, and wherein the forming the cathode includes forming the remaining portion so as to be non-parallel with the anode so as to reduce shunt current at the seal portion.

In some embodiments of this aspect, the forming the cathode includes forming the remaining portion so as to include a parallel portion that is parallel with the anode and a rising step portion that is not parallel with the anode. In some of these embodiments, the forming the remaining portion includes forming the parallel portion so as to be disposed a first distance from the anode, the rising step portion is disposed at a second distance from the anode, the first distance is greater than the second distance, and the forming the remaining portion includes forming the rising step portion so as to connect the parallel portion with the seal portion.

In some embodiments of this aspect, the forming the cathode includes forming the remaining portion to be curved such that at least one portion of the remaining portion is disposed a first distance from the anode, the seal portion is disposed at a second distance from the anode, and the first distance is less than the second distance.

In some embodiments of this aspect, the forming the anode includes forming the anode so as to include an anode seal portion disposed adjacent to the seal and an anode remaining portion separated from the seal by the anode seal portion, and the forming the cathode includes forming remaining portion so as to be non-parallel with the anode remaining portion.

In some embodiments of this aspect, the forming the cathode includes forming the remaining portion so as to include an end that is bent toward the anode.

Another aspect of the present disclosure is drawn to a fuel cell system including a fuel cell, an anode, a cathode, a manifold surrounding the anode and the cathode, the improvement including: wherein the cathode includes a seal portion and a remaining portion, and wherein the remaining portion of the cathode is configured to be non-parallel with the anode so as to reduce shunt current at the seal portion.

In some embodiments of this aspect, the remaining portion of the cathode includes a parallel portion that is parallel with the anode and a rising step portion that is not parallel with the anode. In some of these embodiments, the parallel portion is disposed a first distance from the anode and the rising step portion is disposed at a second distance from the anode, the first distance is greater than the second distance, and the rising step portion connects the parallel portion with the seal portion.

In some embodiments of this aspect, the remaining portion of the cathode is curved such that at least one portion of the remaining portion is disposed a first distance from the anode and the seal portion is disposed at a second distance from the anode, and the first distance is less than the second distance.

In some embodiments of this aspect, the anode includes an anode seal portion disposed adjacent to the seal and an anode remaining portion separated from the seal by the anode seal portion, and the remaining portion of the cathode is configured to be non-parallel with the anode remaining portion.

In some embodiments of this aspect, the remaining portion of the cathode includes an end that is bent toward the anode.

BRIEF SUMMARY OF THE DRAWINGS

The accompanying drawings, which are incorporated in and form a part of the specification, illustrate and explain example embodiments. In the drawings:

FIG. 10A illustrates a non-limiting example embodiment of stack of cells having a modified cathode length in accordance with aspects of the present disclosure;

FIG. 10B illustrates a non-limiting example embodiment of stack of cells having a modified cathode shape in accordance with aspects of the present disclosure;

FIG. 11A illustrates electrolyte potential and current density vector results of a simulation of a portion of a related art fuel cell system;

FIG. 11B illustrates electrolyte potential and current density vector results of a simulation of a portion of a fuel cell system having a square-shaped cathode in accordance with aspects of the present disclosure;

FIG. 14 illustrates a graph comparing normalized current density of the fuel cells of FIGS. 11A-D;

FIG. 15A illustrates electrolyte potential and current density vector of a related art fuel cell;

FIG. 15B illustrates electrolyte potential and current density vector of a fuel cell having square shaped cathodes in accordance with aspects of the present disclosure;

FIG. 15C illustrates electrolyte potential and current density vector of a fuel cell having square shaped cathodes with an extended length in accordance with aspects of the present disclosure;

FIG. 15D illustrates electrolyte potential and current density vector of a fuel cell having square shaped cathodes with bent ends in accordance with aspects of the present disclosure;

DETAILED DESCRIPTION

Electrolytic corrosion is a major topic that affects the lifetime of fuel cells. Electrochemical oxidation of the surface of bipolar plates, particularly the cathode, leads to all kinds of functional degradations. In particular, the potential difference between the anode and cathode causes the corrosion reactions around the seal area. Eventually, the seal will lose its adhesive strength. This will be described in greater detail with reference to FIGS. 1-5C.

Figure 1:
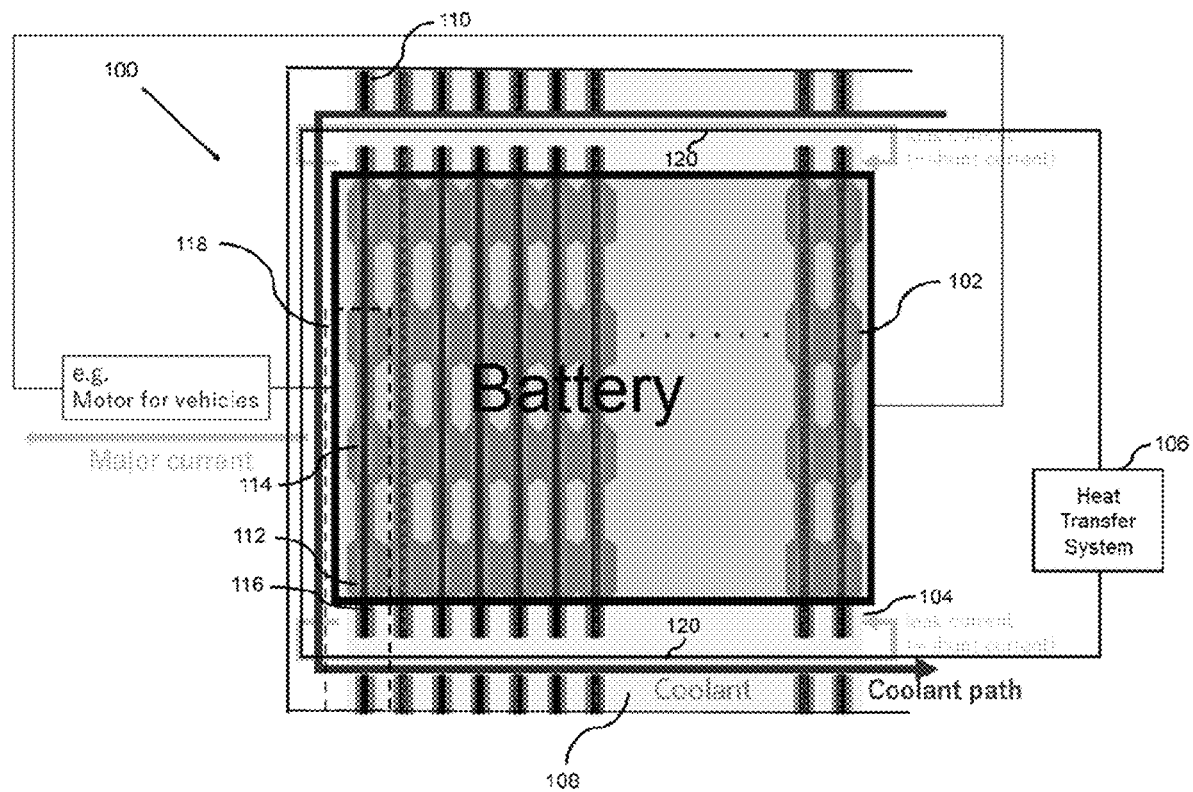
FIG. 1 illustrates a related art fuel cell system.

FIG. 1 illustrates a related art fuel cell system 100.

As shown in the figure, fuel cell system 100 includes a stack of an array of fuel cells 102, a manifold 104, a heat transfer system 106, and a coolant 108. Stack of the array of fuel cells 102 includes a plurality of fuel cells connected in series, a sample of which is indicated by plurality of fuel cells 110. Each of the plurality of fuel cells connected in series includes individual fuel cells connected in series, a sample of which is indicated by fuel cell 112 and fuel cell 114 within plurality of fuel cells 110.

Each fuel cell may be any known type of fuel cell.

Coolant 108 is contained within manifold 104 and may be any known type of coolant that is configured to absorb heat generated by the stack of the array of fuel cells 102.

Heat transfer system 106 may be any known type of heat transfer system that is configured to extract heat from coolant 108 and expel the heat to outside of fuel cell system 100.

In operation, each plurality of fuel cells will generate a voltage, which is added in series to the last cell in the series. For example, in plurality of fuel cells 110, all the cells will add voltage until the final summed voltage is accumulated at the cathode at the end 116. Channel 120 enables coolant 108 to circulate through the ends of each plurality of cells within the stack and absorb heat to prevent overheating of the fuel cells.

Heat transfer system 106 receives heated coolant 108 from manifold 104, removes the heat from heated coolant 108, and recycles cooled coolant back into manifold 104. In this way, the stack of fuel cells does not overheat. The coolant path is provided to regulate the temperature of the array of fuel cells 102. Coolant 108 flows through the array of fuel cells 102 and the manifold 104 of fuel cell system 104.

Coolant 108 contains some electrolytes to enable transfer of the charge from end 116 to output cathode/anode pair 118, and similarly for the rest of the cells in the stack. Unfortunately, the electrolytes in coolant 108 additionally react with the exposed cathodes within the stack. This will be described in greater detail with portion 118 and with reference to FIG. 2A.

Figure 2A:
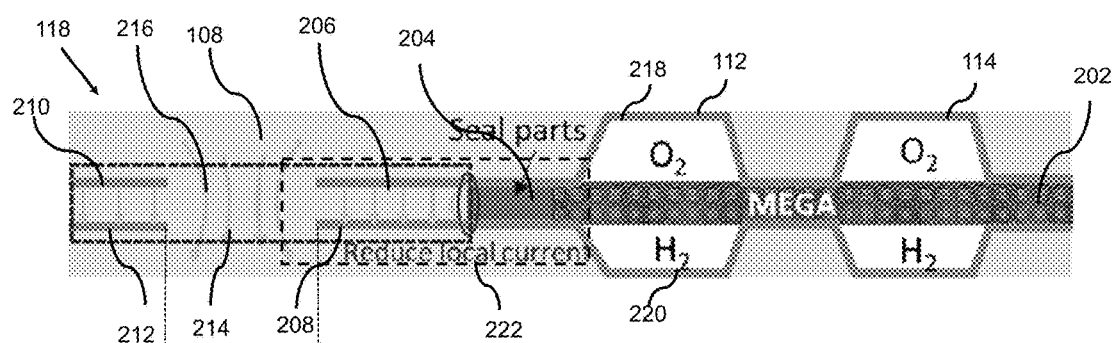
FIG. 2A illustrates an exploded view of a portion of the related art fuel cell system of FIG. 1.
Figure 2B:
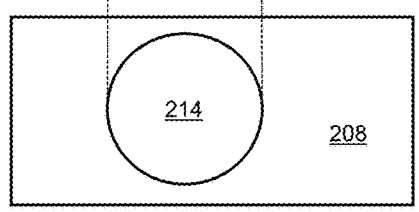
FIG. 2B illustrates a side view of an anode fuel cell system of FIG. 1.

FIG. 2A illustrates an exploded view of portion 118 of related art fuel cell system 100. FIG. 2B illustrates a side view of an anode 208 in exploded view portion 118.

As shown in the figure, portion 118 includes coolant 108, fuel cell 112, fuel cell 114, membrane electrode gas-diffusion layer assembly (MEGA) 202, a seal 204, a cathode 206, and anode 208. Current flows from anodes to cathodes and through a hole 214 within coolant 108 as shown by arrows 216. Each cathode and anode include a hole, similar to hole 214, which together form channel 120, as shown in FIG. 1.

Each fuel cell includes a positively charged cathodic side, a sample of which indicated as cathodic side 218, and a negatively charges anodic side, a sample of which is indicated as anodic side 220. Each cathodic side is separated from a respective anodic side by MEGA 202. MEGA 202 permits charge transfer from an anodic side to a respective cathodic side, without enabling the constituents of the cathodic side to physically contact the constituents of the anodic side, and vice versa. Positive charge flows from an anode to a cathode in MEGA 202 (or in side of the fuel cell), but positive charge flows from a cathode to an anode in the coolant path.

Coolant 108 contacts exposed cathode 206 and exposed anode 208. As a result of this contact, coolant oxidizes (corrodes) these electrodes at different rates. In particular, as will be discussed in greater detail below, the rate of oxidation is related to the shunt current density at an electrode. Further, as will be described in greater detail below, the area of a cathode that is facing an anode and is closest to the seal has the greatest shunt current density and therefore has the greatest rate of oxidation.

Further, returning to FIG. 1, the potential difference experienced throughout coolant 108 increases from right to left. As such, the area of a cathode, at area 116, that is facing an anode and is closest to the seal has the greatest shunt current density and therefore has the greatest rate of oxidation.

Figure 3:
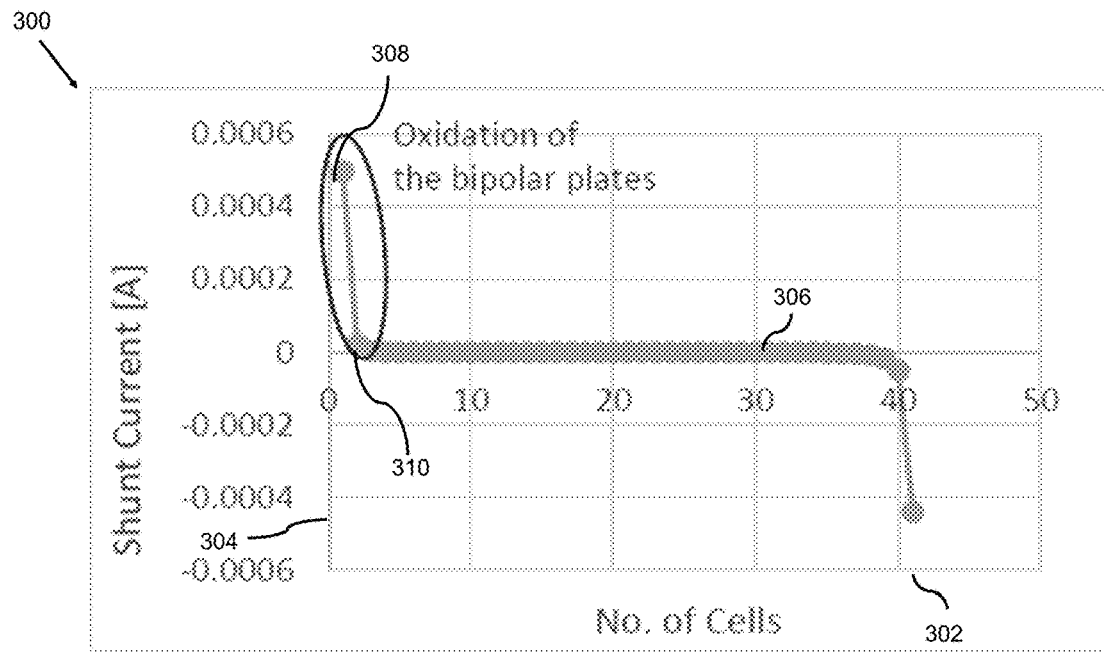
FIG. 3 illustrates a graph of shunt current as a function of the number of cells in the related art fuel cell system of FIG. 1.

FIG. 3 illustrates a graph 300 of shunt current as a function of the number of cells in related art fuel cell system 100.

As shown in the figure, graph 300 includes an x-axis 302 representing the number of arrays of fuel cells, a y-axis 304 of shunt current measured in amps, and a plot 306. Plot 306 includes an entry for each array of fuel cells, samples of which include entry 308 and entry 310.

Let entry 308 correspond to the area of a cathode, at area 116, that is facing an anode and is closest to the seal. Further, let entry 310 correspond to the area of the cathode, directly to the right of area 116 as shown in FIG. 1, that is facing an anode and is closest to the seal.

As shown in graph 300 of FIG. 3, there is a dramatic increase in the shunt current at area 116 as compared to the next closest cathode.

The area of a cathode that is facing an anode and is closest to the seal, and which has the greatest shunt current density will now be further described in greater detail with reference to FIG. 4.

Figure 4:
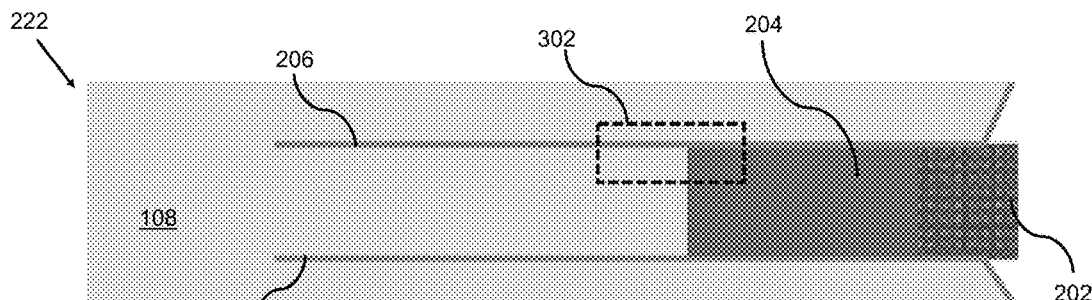
FIG. 4 illustrates an exploded view of a portion of the portion of the related art fuel cell system of FIG. 2A.

FIG. 4 illustrates an exploded view of portion 222 of portion 118 of FIG. 2A.

As shown in FIG. 4, portion 222 includes coolant 108, MEGA 202, seal 204, cathode 206, anode 208. A portion 302 is outlined in a dotted line which includes the area of cathode 206 that is facing anode 208 and is closest to seal 204. The effect of the oxidation of this area as a result of the increased shunt current will be described in greater detail with reference to FIGS. 5A-C.

Figure 5A:
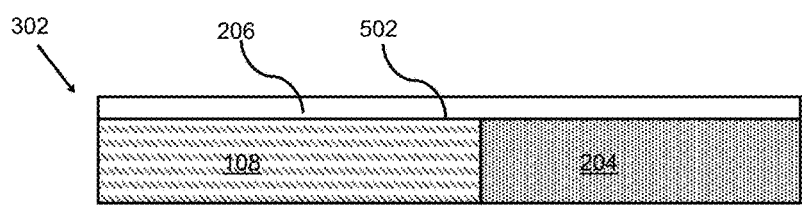
FIG. 5A illustrates a portion of the exploded view of FIG. 4 at a time $t_0$.

FIG. 5A illustrates portion 302 of FIG. 4 at a time $t_0$.

As shown in FIG. 5A, cathode 206 includes a surface 502 in contact with coolant 108 and seal 204. For purposes of discussion, presume that the cell including cathode 206 has not yet been used, such that there has been no reaction between coolant 108 and surface 502.

Figure 5B:
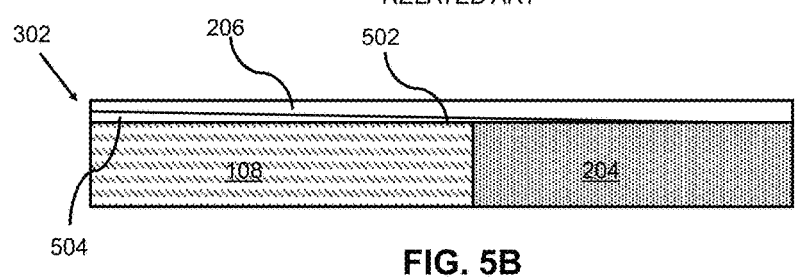
FIG. 5B illustrates the portion of FIG. 5A at a time $t_1$.

FIG. 5B illustrates portion 302 of FIG. 5A at a time $t_1$.

As shown in FIG. 5B, after some time, i.e., $t_1-t_0$, coolant 108 has reacted with cathode 206 to corrode cathode 206 as represented by corroded area 504 within cathode 206.

Figure 5C:
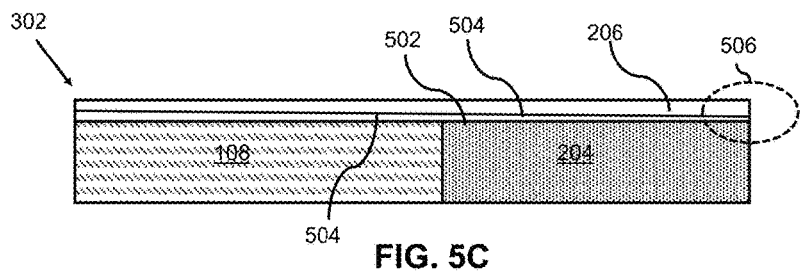
FIG. 5C illustrates the portion of FIG. 5A at a time $t_2$.

FIG. 5C illustrates portion 302 of FIG. 5A at a time $t_2$.

As shown in FIG. 5C, ultimately corroded area 504 has grown such that seal 204 might be removed at area 506. The removal of seal 204 at area 506 may result in gases from the cell mixing with coolant 108, which breaks the cell.

There are two conventional ways to protect bipolar plates against oxidation.

The first is to fabricate a layer of precious metal such as gold or platinum on the plate. Because they are anti-oxidant materials, only the electrolysis of water occurs and the surface metal condition remains unchanged. Carbon or resin are also be used as cheaper materials for similar purposes.

The second conventional way to protect bipolar plates against oxidation is to use the end cell as a sacrificial electrode. Because the currents from all the cells in the stack are balanced by Kirchhoff's current law, placing an easily oxidized plate at the end of the stack can reduce the amount of oxidation current flowing through the rest of the cells.

However, the above-mentioned techniques are expensive because they require the use of costly materials and equipment.

There is a lot of research trying to reduce the costs by tuning material composition, deposition method and so on. However, they are still too expensive to promote in the use of fuel cells.

What is needed is a system and method for protecting bipolar plates in a fuel cell system against oxidation without fabricating additional layers of precious metals on the plates and without sacrificing the electrodes in the end cell.

A system and method in accordance with the present disclosure protects bipolar plates in a fuel cell system against oxidation without fabricating additional layers of precious metals on the plates and without sacrificing the electrodes in the end cell.

The purpose of a fuel cell system in accordance with aspects of the present disclosure is to improve durability of the seal part which separate the coolant and gas domains.

A fuel cell system in accordance with aspects of the present disclosure focuses on corrosion in the coolant domain where very high voltage is potentially applied to hundreds of stacked cells and the large shunt current accelerates the chemical reactions on the bipolar plates.

The proposed technique does not require any additional layer to protect the surface of the bipolar plate from corrosion. As such a fuel cell in accordance with aspects of the present disclosure provides a more durable fuel cell in an economical manner.

An example system and method for protecting bipolar plates in a fuel cell system against oxidation without fabricating additional layers of precious metals on the plates and without sacrificing the electrodes in the end cell in accordance with aspects of the present disclosure will now be described in greater detail with reference to FIGS. 6-18.

Figure 6:
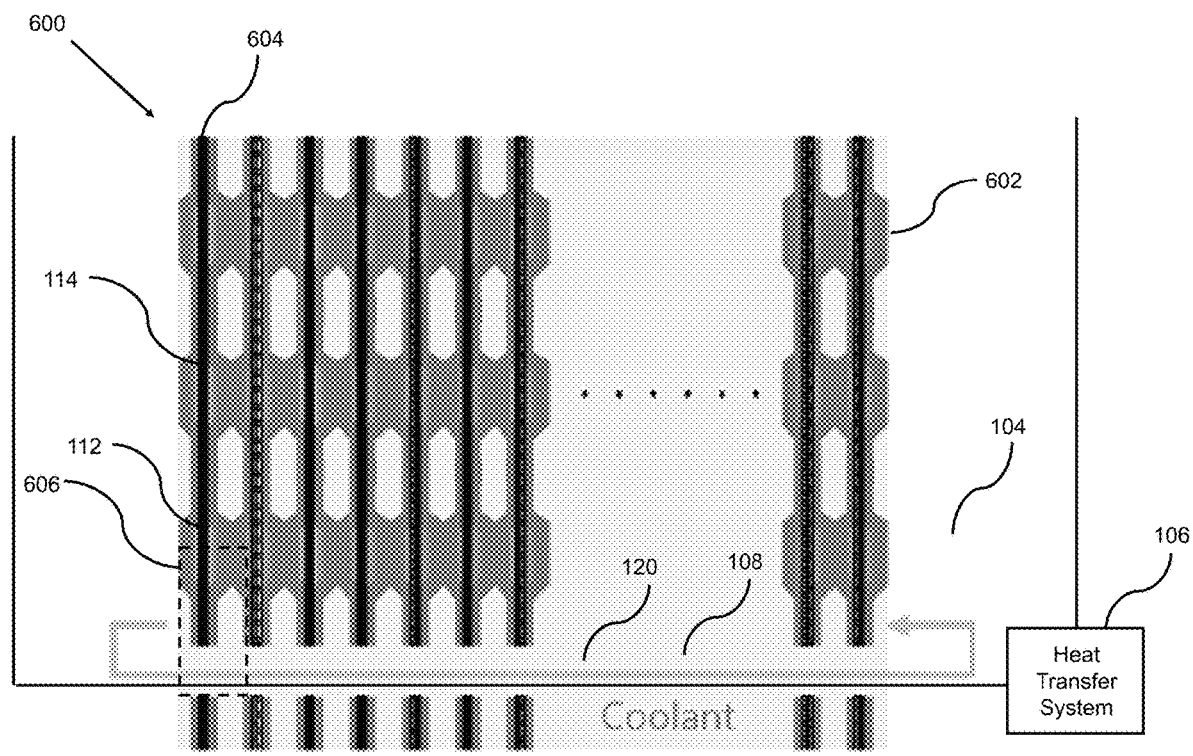
FIG. 6 illustrates a fuel cell system in accordance with aspects of the present disclosure.

FIG. 6 illustrates a fuel cell system 600 in accordance with aspects of the present disclosure.

As shown in the figure, fuel cell system 600 includes a stack of an array of fuel cells 602, manifold 104, heat transfer system 106, and coolant 108. Stack of the array of fuel cells 602 includes a plurality of fuel cells connected in series, a sample of which is indicated by plurality of fuel cells 604. Each of the plurality of fuel cells connected in series includes individual fuel cells connected in series, a sample of which is indicated by fuel cell 112 and fuel cell 114 within plurality of fuel cells 604.

Fuel cell system 600 operates in a manner similar to fuel cell system 100 discussed above with reference to FIG. 1. However, as will be discussed in greater detail below, fuel cell system 600 includes modified cathodes which reduce shunt current near the seal and thus reduce the rate of corrosion.

Slowing down the reaction rate at a particular site can be achieved by changing the shape of each cell or the shape of the entire stack. This will be described in greater detail with reference to FIG. 7.

Figure 7:
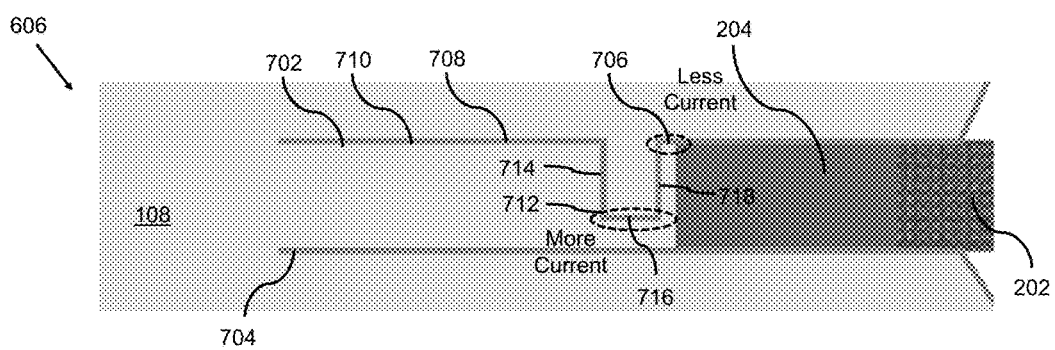
FIG. 7 illustrates an exploded view of a portion of the fuel cell system of FIG. 6.

FIG. 7 illustrates an exploded view of portion 606 of fuel cell system 600.

As shown in FIG. 7, portion 606 includes coolant 108, MEGA 202, seal 204, a cathode 702, and an anode 704. Cathode 702 includes a seal portion 706 disposed adjacent to seal 204 and a remaining portion 708 separated from seal 204 by seal portion 706.

As will be described in greater detail below, remaining portion 708 is configured to be non-parallel with anode 704 so as to reduce shunt current at seal portion 706. In this non-limiting example embodiment, remaining portion 708 is configured to be non-parallel with anode 704 by including a parallel portion 710 and a square portion 712. Parallel portion 710 is disposed to be parallel with anode 704 and at a first distance from anode 704.

Square portion 712 includes a lowering step portion 714, a flat portion 716, and a rising step portion 718. Flat portion 716 connects lowering step portion 714 with rising step portion 718 so as to form a "square" shape. Flat portion 716 is disposed at a second distance from anode 704, wherein the first distance in which parallel portion 710 is located from anode 704 is greater than the second distance. In other words, flat portion 716 is closer to anode 704 than parallel portion 710. Further square portion 712 is disposed between parallel portion 710 and seal portion 706, so as to connect parallel portion 710 with seal portion 706.

Cathode 702 has a shape to reduce the shunt current around the area next to seal 204. Having square portion 712 right next to seal 204 and close to anode 704 will reduce the shunt current next to seal 204. The current flow between cathode 702 and anode 704 is collected to the more at flat portion 716 and less at seal portion 706.

It should be noted, that other shapes of cathodes may be implemented in accordance with exemplary embodiments. These will be described in greater detail with reference to FIGS. 8A-D.

Figure 8A:
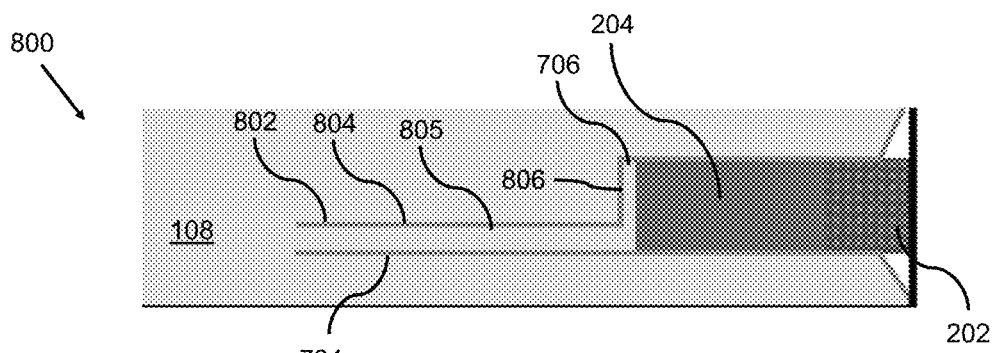
FIG. 8A illustrates a non-limiting example embodiment of a cathode in accordance with aspects of the present disclosure.

FIG. 8A illustrates a non-limiting example embodiment of a cathode in accordance with aspects of the present disclosure.

As shown in FIG. 8A, portion 800 includes coolant 108, MEGA 202, seal 204, a cathode 802, and anode 704. Cathode 802 includes seal portion 706 disposed adjacent to seal 204 and a remaining portion 804 separated from seal 204 by seal portion 706.

In this non-limiting example embodiment, remaining portion 804 is configured to be non-parallel with anode 704 so as to reduce shunt current at seal portion 706. Remaining portion 804 includes a parallel portion 805 and a rising step portion 806. Parallel portion 805 is disposed to be parallel with anode 704 and a first distance from anode 704. However, rising step portion 806 is not parallel with anode 704, and is disposed between parallel portion 805 and seal portion 706, so as to connect parallel portion 805 with seal portion 706.

Figure 8B:
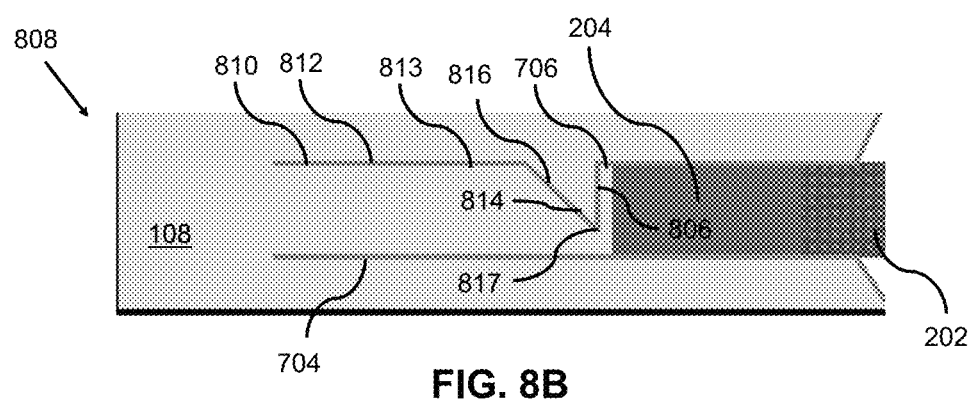
FIG. 8B illustrates another non-limiting example embodiment of a cathode in accordance with aspects of the present disclosure.

FIG. 8B illustrates another non-limiting example embodiment of a cathode in accordance with aspects of the present disclosure.

As shown in the figure, portion 808 includes coolant 108, MEGA 202, seal 204, a cathode 810, and anode 704. Cathode 810 includes seal portion 706 disposed adjacent to seal 204 and a remaining portion 812 separated from seal 204 by seal portion 706.

Remaining portion 812 is configured to be non-parallel with anode 704 so as to reduce shunt current at seal portion 706. In this non-limiting example embodiment, remaining portion 812 is configured to be non-parallel with anode 704 by including a parallel portion 813 and a sawtooth portion 814. Parallel portion 810 is disposed to be parallel with anode 704 and at a first distance from anode 704.

Sawtooth portion 814 includes a lowering portion 816 and rising step portion 806, which together form a "sawtooth" shape. Lowering portion 816 extends toward anode 704 so as to connect with rising step portion 806 at a point 817, which is at a second distance from anode 704. Accordingly, the first distance in which parallel portion 810 is located from anode 704 is greater than the second distance. In other words, point 817 of sawtooth portion 814 is closer to anode 704 than parallel portion 710. Further sawtooth portion 814 is disposed between parallel portion 810 and seal portion 706, so as to connect parallel portion 810 with seal portion 706.

Figure 8C:
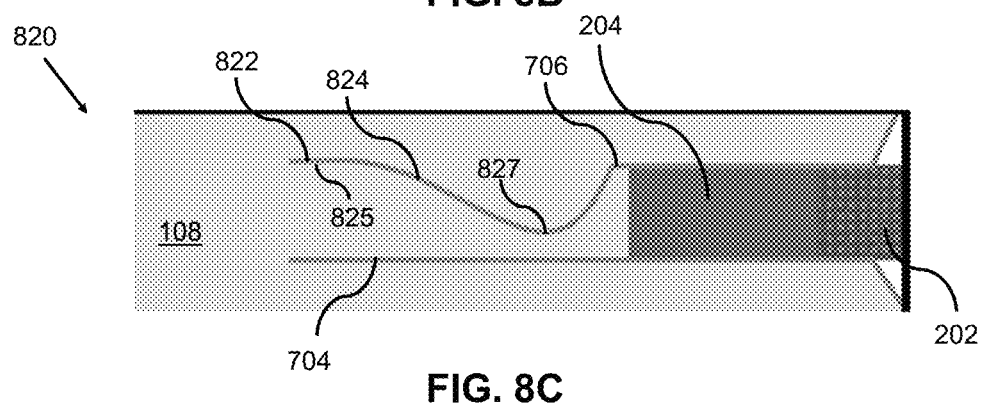
FIG. 8C illustrates another non-limiting example embodiment of a cathode in accordance with aspects of the present disclosure.

FIG. 8C illustrates another non-limiting example embodiment of a cathode in accordance with aspects of the present disclosure.

As shown in the figure, portion 820 includes coolant 108, MEGA 202, seal 204, a cathode 822, and anode 704. Cathode 822 includes seal portion 706 disposed adjacent to seal 204 and a remaining portion 824 separated from seal 204 by seal portion 706.

Remaining portion 824 is configured to be non-parallel with anode 704 so as to reduce shunt current at seal portion 706. In this non-limiting example embodiment, remaining portion 824 is configured to be non-parallel with anode 704 by having a "wave" shape.

Remaining portion 824 starts at a highest point 825, curves toward anode 704 to reach a lowest point 827, and then curves up to connect to seal portion 706. Highest point 825 is disposed at a first distance from anode 704, whereas lowest point 827 is at a second, closer distance from anode 704.

Figure 8D:
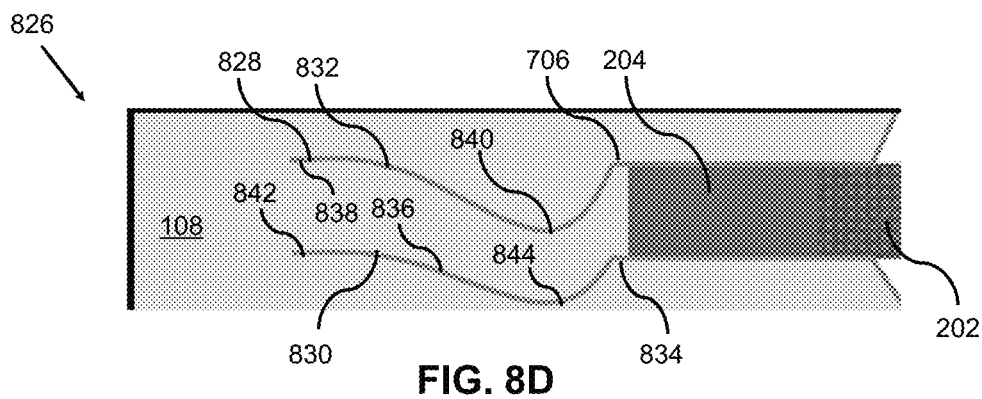
FIG. 8D illustrates another non-limiting example embodiment of a cathode and anode in accordance with aspects of the present disclosure.

FIG. 8D illustrates another non-limiting example embodiment of a cathode and anode in accordance with aspects of the present disclosure.

As shown in the figure, portion 826 includes coolant 108, MEGA 202, seal 204, a cathode 828, and an anode 830. Cathode 828 includes seal portion 706 disposed adjacent to seal 204 and a remaining portion 832 separated from seal 204 by seal portion 706. Anode 830 includes seal portion 834 disposed adjacent to seal 204 and a remaining portion 836 separated from seal 204 by seal portion 834.

Remaining portion 832 of cathode 828 is configured to be non-parallel with anode 830 so as to reduce shunt current at seal portion 706. In this non-limiting example embodiment, remaining portion 832 of cathode 828 is configured to be non-parallel with anode 830 by having a first "wave" shape, whereas remaining portion 836 of anode 830 is configured to be non-parallel with cathode 828 by having a second "wave" shape. Accordingly, in this embodiments, the anode/cathode pair form a "double wave" shape.

Remaining portion 824 of cathode 828 starts at a highest point 838, curves toward anode 830 to reach a lowest point 840, and then curves up to connect to seal portion 706. Remaining portion 836 of anode 830 starts at a highest point 842, curves downward to reach a lowest point 844, and then curves up to connect to seal portion 834. Highest point 828 of cathode 828 is disposed at a first distance from highest point 842 of anode 830, whereas lowest point 840 of cathode 828 is at a second, closer distance from lowest point 844 of anode 830.

In this embodiment, bending anode 830 in the same direction as cathode 828 also reduces the current density. It has smaller effect but helps to avoid short circuits.

The stack durability is improved by utilizing the shapes discussed above with reference to FIGS. 7-8D for cells throughout the stack. The durability of the stack may be further improved when there are more degrees of freedom for the shape design. In general, more currents flow on the cell placed on end of the stack, which determines the lifetime of fuel cell stack.

It is important to reduce the shunt current at the area of the cathode that is near the seal and that is facing the anode. It is particularly important for the highest cell in the stack, as the potential builds for each cell in the stack. This will be described in greater detail with reference to FIGS. 9A-B.

Figure 9A:
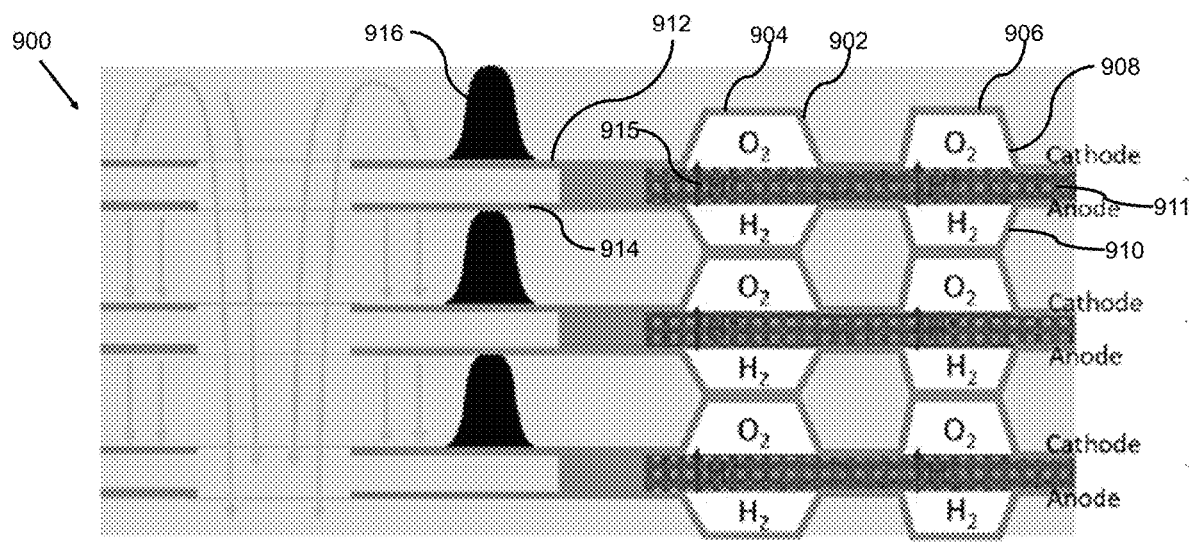
FIG. 9A illustrates a portion of a stack of cells in a related art fuel cell system.

FIG. 9A illustrates a portion 900 of a stack of cells in a related art fuel cell system.

As shown in the figure, portion 900 includes an array of individual cells, arranged as a stack of sets of serially connected individual cells, a sample of which is indicated as set of serially connected cells 902, which includes a cell 904 that is serially connected to a cell 906. Each cell includes a negative ion compartment, a sample of which is indicated as negative ion compartment 908 within cell 906, and a positive ion compartment, a sample of which is indicated as positive ion compartment 910 within cell 906. The positive and negative ion compartments are separated by a MEGA, a sample of which is indicated as MEGA 911 within set of serially connected cells 902. A cathode is disposed on the side of each serially connected cells that has the negative ion compartments, a sample of which is indicated as cathode 912. An anode is disposed on the side of each serially connected cells that has the positive ion compartments, a sample of which is indicated as anode 914.

Electrons pass from each negative ion compartment, through a respective MEGA and into a respective positive ion compartment, as indicated by the set of arrows, a sample of which is indicated as arrows 915. This transfer of ions through each set of serially connected cells is collected by a respective cathode, which creates a potential difference between the cathode and a respective anode. These potentials are added to provide a total amount of DC voltage for the entire fuel cell system, and can be represented by a circuit model. Gaskets, a sample of which in indicated as gasket 916 separates stacked fuel cells.

Figure 9B:
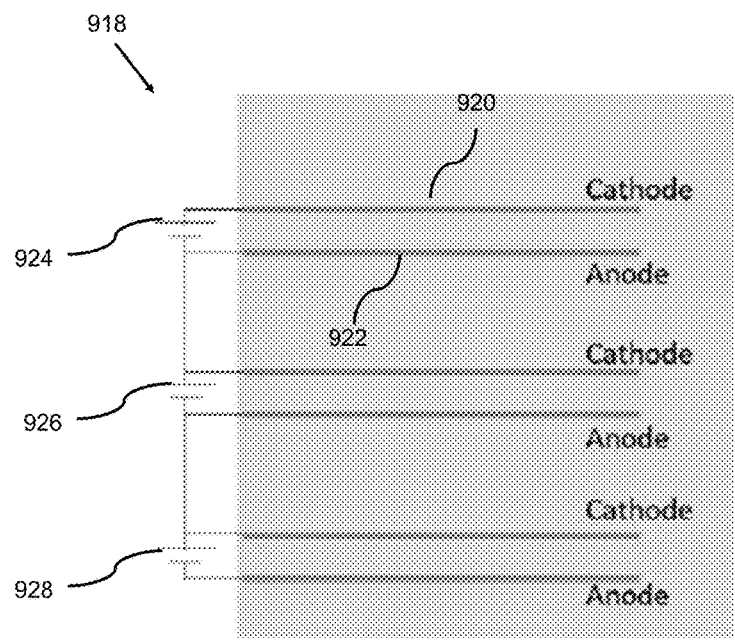
FIG. 9B illustrates an equivalent circuit model of the portion of the stack of cells of FIG. 9A.

FIG. 9B illustrates an equivalent circuit model 918 of portion 900 of FIG. 9A.

As shown in FIG. 9B, equivalent circuit model 918 includes: three sets of anodes and cathodes, a sample of which is indicated as cathode 920 and anode 922; and three DC voltage sources 924, 926 and 928. Cathode 920 corresponds to cathode 912 of set of serially connected cells 902 of FIG. 9A, whereas anode 922 corresponds to anode 914 of set of serially connected cells 902 of FIG. 9A. Similarly, DC voltage source 924 corresponds to the potential difference at cathode 912 of FIG. 9A. Accordingly, portion 900 of FIG. 9A is able to provide a total DC voltage equal to the voltages of DC voltage sources 924, 926 and 928 as shown in FIG. 9B.

There is more chance of oxidation on the cathode surface that faces the anode because of the potential difference. While changing the shape of the cathode may reduce the rate of oxidation, there are additional mechanisms to further reduce the rate of oxidation.

Narrowing the manifold size (or placing the seal parts farther from the manifold end) is one of the solutions to reduce the current flow on the end cell. This will be described in greater detail with reference to FIG. 10A.

FIG. 10A illustrates a non-limiting example embodiment of stack of cells 1000 having a modified cathode length in accordance with aspects of the present disclosure.

As shown in the figure, each electrode in stack of cells 1000 has a length extension, a sample of which is indicated as a cathode 1004 having an extension 1006.

However, extending the electrode length as discussed above increases the pressure drop of the cooling system and more wider cells and/or higher pumping powers are required.

By bending the end of the cathode, the pressure drop of the cooling system is decreased as compared to that of the extended electrodes discussed above with reference to FIG. 10A. This will be described in greater detail with reference to FIG. 10B.

FIG. 10B illustrates a non-limiting example embodiment of stack of cells 1002 having a modified cathode shape in accordance with aspects of the present disclosure.

As shown in the figure, each electrode in stack of cells 1002 has an end that is bent toward a corresponding anode, a sample of which is indicated as a cathode 1008 having an end 1010 that is bent toward an anode 1012.

Further, more wider cells and/or higher pumping powers are not required, although the performance gain is somewhat reduced. This shape modification technique is more effective when the coolant conductivity is high.

The following discussion of FIGS. 11A-16 describe how changing the cathode shape in accordance with aspects of the present disclosure decrease shunt current and therefore decrease the rate of oxidation of the cathode.

FIG. 11A illustrates electrolyte potential and current density vector results of a simulation of a portion 1100 of a related art fuel cell system.

As shown in the figure, portion 1100 includes a cathode 1102, an anode 1104 and coolant 1106. Current lines are shown as arrows, a sample of which is indicated as current line 1108. A voltage key 1110 indicates the value of the electrolyte potential within coolant 1006 and is measured between 0.1-0.9V.

In this simulation, the electrodes materials are assumed as stainless steel (SUS 316L) and a coolant conductivity is 1 µS/m. The electrode distance is set to 1 mm and the potential difference is set to 1V. The average shunt current at the bottom of cathode 1102 near the seal (not shown) at area 1112 is evaluated in the 2D axisymmetric configuration. In the simulation, the average shunt current at area 1112 is 97 nA/cm².

FIG. 11B illustrates electrolyte potential and current density vector results of a simulation of a portion 1101 of a fuel cell system having a square-shaped cathode in accordance with aspects of the present disclosure.

As shown in the figure, portion 1101 includes a cathode 1114, an anode 1116 and coolant 1118. Current lines are shown as arrows, a sample of which is indicated as current line 1120. A voltage key 1122 indicates the value of the electrolyte potential within coolant 1118 and is measured between 0.1-0.9V.

In this simulation, again, the electrodes materials are assumed as stainless steel (SUS 316L) and a coolant conductivity is 1 µS/m. The electrode distance is again set to 1 mm and the potential difference is set to 1V. The average shunt current at the bottom of cathode 1114 near the seal (not shown) at area 1124 is evaluated in the 2D axisymmetric configuration. In the simulation, the average shunt current at area 1124 is 25 nA/cm², which is a 74% reduction as compared to the related art system discussed above with reference to FIG. 11A.

Figure 11C:
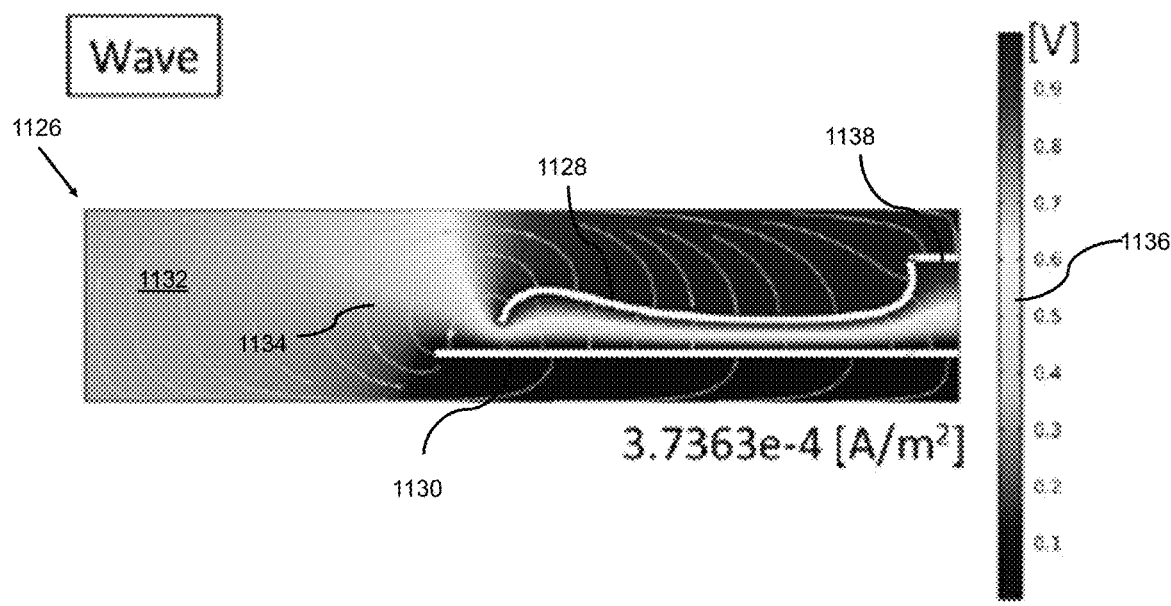
FIG. 11C illustrates electrolyte potential and current density vector results of a simulation of a portion of a fuel cell system having a wave-shaped cathode in accordance with aspects of the present disclosure.

FIG. 11C illustrates electrolyte potential and current density vector results of a simulation of a portion 1126 of a fuel cell system having a wave-shaped cathode in accordance with aspects of the present disclosure.

As shown in the figure, portion 1126 includes a cathode 1128, an anode 1130 and coolant 1132. Current lines are shown as arrows, a sample of which is indicated as current line 1134. A voltage key 1136 indicates the value of the electrolyte potential within coolant 1132 and is measured between 0.1-0.9V.

In this simulation, again, the electrodes materials are assumed as stainless steel (SUS 316L) and a coolant conductivity is 1 µS/m. The electrode distance is again set to 1 mm and the potential difference is set to 1V. The average shunt current at the bottom of cathode 1128 near the seal (not shown) at area 1138 is evaluated in the 2D axisymmetric configuration. In the simulation, the average shunt current at area 1138 is 37 nA/cm², which is a 62% reduction as compared to the related art system discussed above with reference to FIG. 11A.

Figure 11D:
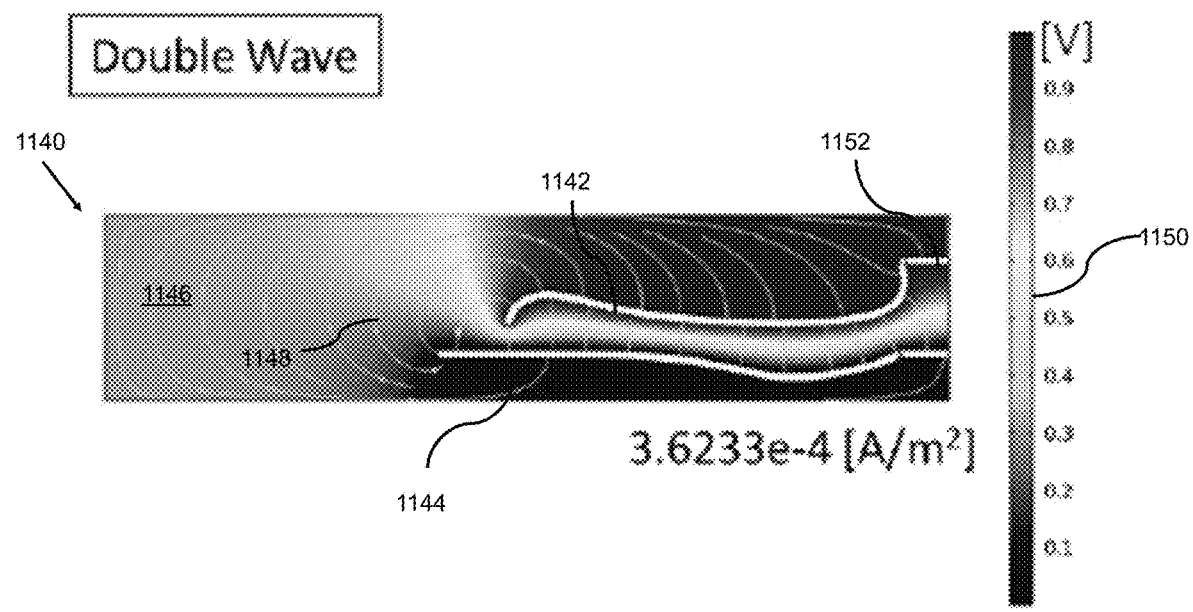
FIG. 11D illustrates electrolyte potential and current density vector results of a simulation of a portion 1442 of a fuel cell system having a double wave-shaped anode and cathode in accordance with aspects of the present disclosure.

FIG. 11D illustrates electrolyte potential and current density vector results of a simulation of a portion 1138 of a fuel cell system having a double wave-shaped anode and cathode in accordance with aspects of the present disclosure.

As shown in the figure, portion 1140 includes a cathode 1142, an anode 1144 and coolant 1146. Current lines are shown as arrows, a sample of which is indicated as current line 1148. A voltage key 1150 indicates the value of the electrolyte potential within coolant 1146 and is measured between 0.1-0.9V.

In this simulation, again, the electrodes materials are assumed as stainless steel (SUS 316L) and a coolant conductivity is 1 µS/m. The electrode distance is again set to 1 mm and the potential difference is set to 1V. The average shunt current at the bottom of cathode 1142 near the seal (not shown) at area 1152 is evaluated in the 2D axisymmetric configuration. In the simulation, the average shunt current at area 1153 is 36 nA/cm², which is a 63% reduction as compared to the related art system discussed above with reference to FIG. 11A.

As shown in FIGS. 11A-D, neighboring plates may have a different physical structure to control the current density magnitude. In fact, the structures across the stack may be further tuned, as needed, although only end plate modifications in the stack may be needed. The wave structure in FIG. 11C and double wave structure in FIG. 11D are obtained by optimizing cathode 1128 in the wave structure of FIG. 11C and cathode 1142 and anode 1144 in the double wave structure of FIG. 11D.

Returning to FIG. 7, the durability of seal 204 is enhanced when flat portion 716 of square portion 712 of cathode 702 is closer to anode 704. This will be described in greater detail with reference to FIGS. 12A-B.

Figure 12A:
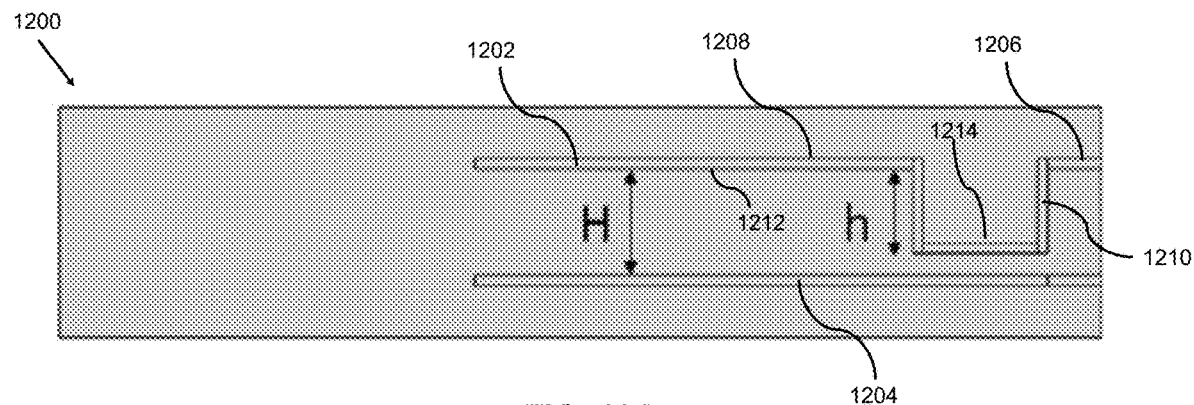
FIG. 12A illustrates a height relationship between a cathode and anode in a fuel cell in accordance with aspects of the present disclosure.

FIG. 12A illustrates a height relationship between a cathode and anode in a portion 1200 of a fuel cell system in accordance with aspects of the present disclosure.

As shown in the figure, portion 1200 includes a cathode 1202 and an anode 1204. Cathode 1202 includes a seal portion 1206 and a remaining portion 1208 configured to be non-parallel with anode 1204 so as to reduce shunt current at seal portion 1206. In this non-limiting example embodiment, remaining portion 1208 is configured to be non-parallel with anode 1204 by including a parallel portion 1212 and a square portion 1210. Parallel portion 1212 is disposed to be parallel with anode 1204 and at a first distance, H, from anode 1204.

Square portion 1210 includes a flat portion 1214 disposed at a second distance, h, from anode 1204, wherein H is greater than h. In other words, flat portion 1214 is closer to anode 1204 than parallel portion 1212.

Figure 12B:
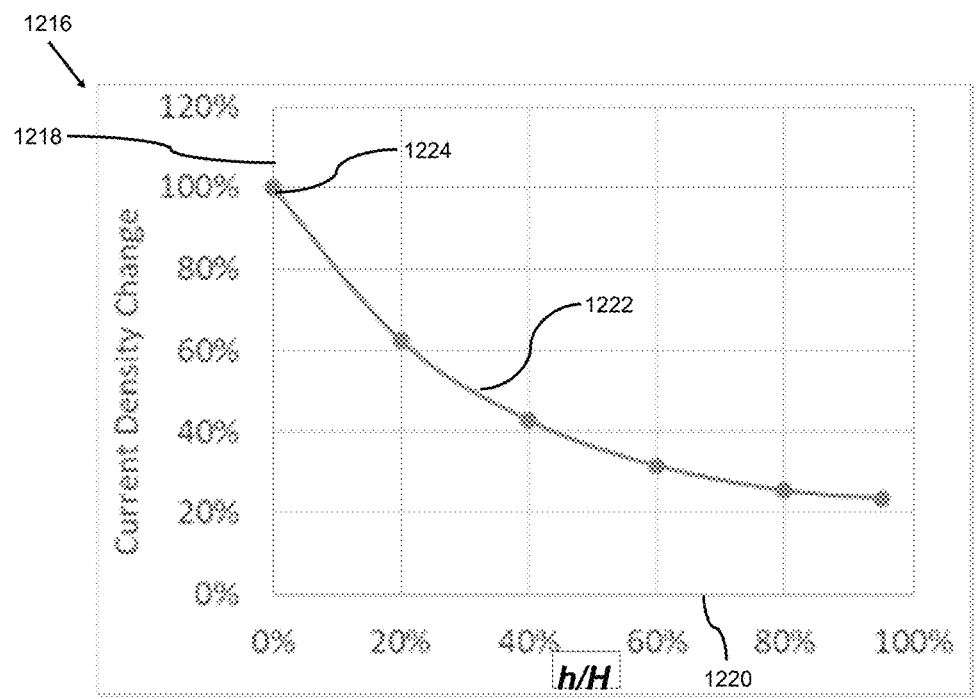
FIG. 12B illustrates a graph of current density change as a function of the ratio of heights between a cathode and anode as shown in FIG. 12A.

FIG. 12B illustrates a graph 1216 of current density change as a function of the ratio of distances between a cathode and anode as shown in FIG. 12A.

As shown in the FIG. 12B, graph 1216 includes a y-axis 1218, an x-axis 1220 and a curve 1222 based on individual plots, a sample of which is indicated as plot 1224. Y-axis 1218 indicates current density change measured in percentages at an underside of a cathode, near the seal. X-axis 1220 indicates a ratio of h/H measured in percentages.

It is clear from graph 1216 that the current density decreases as the ratio of h/H increases. However, the closer two electrodes become, the greater the possibility of an electrical short circuit. Accordingly, the appropriate step height should be decided from machining and assembly precision and size of the foreign particles in the coolant being used.

The length of the electrodes additionally affects a current density change in a cell. This will be described in greater detail with reference to FIGS. 13A-B.

Figure 13A:
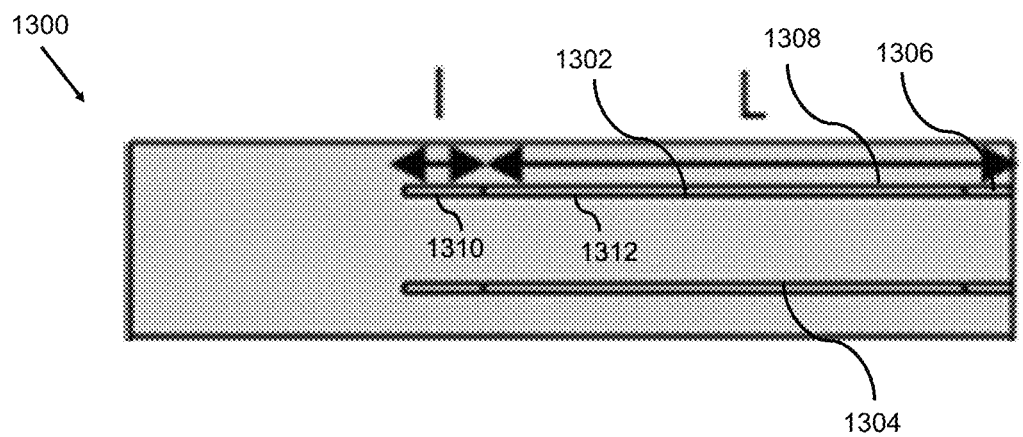
FIG. 13A illustrates a length relationship between portions of a cathode in a fuel cell in accordance with aspects of the present disclosure.

FIG. 13A illustrates a length relationship between portions of a cathode in a portion 1300 of fuel cell system in accordance with aspects of the present disclosure.

As shown in the figure, portion 1300 includes a cathode 1302 and an anode 1304. Cathode 1302 includes a seal portion 1306 and a remaining portion 1308. Cathode 1302 includes an extension 1310 such that a length, L, of seal portion 1306 and a portion 1312 of remaining portion 1308 is greater than a length, l, of extension 1310.

Figure 13B:
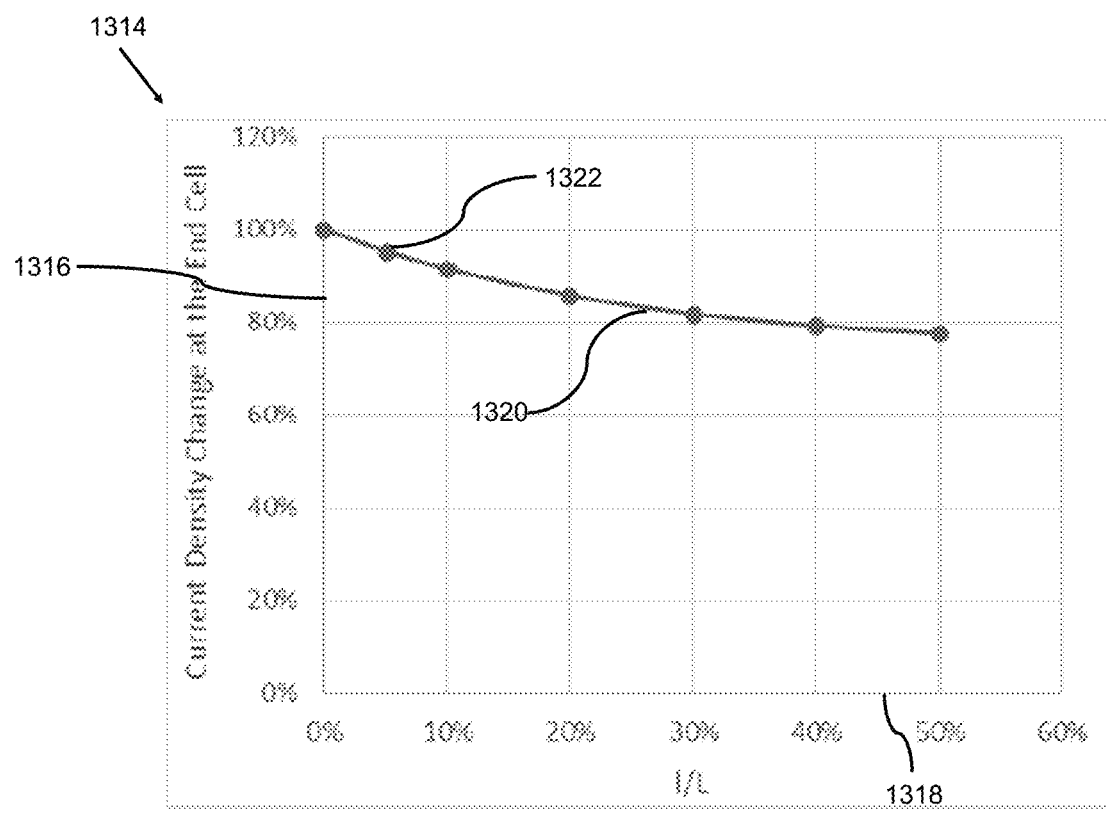
FIG. 13B illustrates a graph of current density change as a function of the ratio of lengths between portions of a cathode as shown in FIG. 13A.

FIG. 13B illustrates a graph 1314 of current density change as a function of the ratio of lengths between portions of a cathode as shown in FIG. 13A.

As shown in the FIG. 13B, graph 1314 includes a y-axis 1316, an x-axis 1318 and a curve 1320 based on individual plots, a sample of which is indicated as plot 1322. Y-axis 1316 indicates current density change measured in percentages at an underside of a cathode, near the seal. X-axis 1318 indicates a ratio of l/L measured in percentages.

In this example, let the coolant conductivity be set to 1,000 μS/m, and let the voltage difference between the cathode 1302 and anode 1304 be 1 V. This value is too large comparing with the real situation and its impact becomes smaller when the conductivity is small. However, actual tests have shown that maintaining a distance between the manifold and the seal is effective at providing up to a 20% reduction in current density change at the end of the cell.

FIG. 14 illustrates a graph 1400 comparing normalized current density of the fuel cell system of FIGS. 11A-D.

As shown in FIG. 14, graph 1400 includes a y-axis 1402, a bar 1404, a bar 1406, a bar 1408, and a bar 1410. Y-axis 1402 indicates normalized current density at an underside of a cathode, near the seal. Bar 1404 corresponds to the normalized current density at an underside of a cathode, near the seal, of the related art cathode as shown in FIG. 11A. Bar 1406 corresponds to the normalized current density at an underside of a cathode, near the seal, of the cathode as shown in FIG. 11B. Bar 1408 corresponds to the normalized current density at an underside of a cathode, near the seal, of the cathode as shown in FIG. 11C. Bar 1410 corresponds to the normalized current density at an underside of a cathode, near the seal, of the cathode as shown in FIG. 11D.

As shown in graph 1400, the reduction rate is slightly smaller in the square shape cathode as shown in FIG. 11B because of the filter radius constraint, which is a constraint on the shape optimization that is added to avoid deformation into a form that cannot be manufactured. It indicates distance between two plates is more important than the detail electrode shape.

FIG. 15A illustrates electrolyte potential and current density vector of a portion 1500 of a related art fuel cell system, wherein each cathode is parallel to its corresponding anode, for example as shown in FIG. 11A.

As shown in FIG. 15A, portion 1500 includes the end of a stack of 20 cells and a coolant 1502. A key 1504 provides reference to the overall potential of the entire stack of 20 cells and ranges from 0.0-20.0 V, with 1.0 V per cell. Current lines are indicated, for example as indicated as current line 1506. In this example, the current density at area 1508, which is on the surface of the cathode that is near the seal (not shown) and is facing the anode, of the top most cell, is 0.04 A/m².

FIG. 15B illustrates electrolyte potential and current density vector of a portion 1510 a fuel cell system having square shaped cathodes in accordance with aspects of the present disclosure, for example as shown in FIG. 11B.

As shown in FIG. 15B, portion 1510 includes the end of a stack of 20 cells and a coolant 1512. A key 1514 provides reference to the overall potential of the entire stack of 20 cells and ranges from 0.0-20.0 V, with 1.0 V per cell. Current lines are indicated, for example as indicated as current line 1516. In this example, the current density at area 1518, which is on the surface of the cathode that is near the seal (not shown) and is facing the anode, of the top most cell, is 0.035 A/m². This is a 12.5% decrease over that of the fuel cell system having a cathode of the shape of FIG. 11A as discussed above with reference to FIG. 15A.

FIG. 15C illustrates electrolyte potential and current density vector of a portion 1520 of a fuel cell system having square shaped cathodes with an extended length in accordance with aspects of the present disclosure, for example as shown in FIG. 11C.

As shown in FIG. 15C, portion 1520 includes the end of a stack of 20 cells and a coolant 1522. A key 1524 provides reference to the overall potential of the entire stack of 20 cells and ranges from 0.0-20.0 V, with 1.0 V per cell. Current lines are indicated, for example as indicated as current line 1526. In this example, the current density at area 1528, which is on the surface of the cathode that is near the seal (not shown) and is facing the anode, of the top most cell, is 0.033 A/m². This is a 17.5% decrease over that of the fuel cell system having a cathode of the shape of FIG. 11A as discussed above with reference to FIG. 15A.

FIG. 15D illustrates electrolyte potential and current density vector of a portion 1530 of a fuel cell system having square shaped cathodes with bent ends in accordance with aspects of the present disclosure, for example as shown in FIG. 11D.

As shown in FIG. 15D, portion 1530 includes the end of a stack of 20 cells and a coolant 1532. A key 1534 provides reference to the overall potential of the entire stack of 20 cells and ranges from 0.0-20.0 V, with 1.0 V per cell. Current lines are indicated, for example as indicated as current line 1536. In this example, the current density at area 1538, which is on the surface of the cathode that is near the seal (not shown) and is facing the anode, of the top most cell, is 0.034 A/m². This is a 15% decrease over that of the fuel cell system having a cathode of the shape of FIG. 11A as discussed above with reference to FIG. 15A.

FIGS. 15A-D illustrate the result of the simulation with the stake of 20 cells. As the effect of extension or bending is very small when the coolant conductivity is kept low, it is set to 1,000 μS/m. The figures show the change of the manifold edge shape reduce the current density around the seal. The larger the distance between manifold and seal area becomes, the lower the current density near the seal becomes. Although the improvement of the bending the end of the cathode as shown in FIG. 15D is smaller than the extending the length of the cathode as shown in FIG. 15C, the bending the end of the cathode as shown in FIG. 15D has the merit to avoid increase of the pressure drop in the cooling system.

Figure 16:
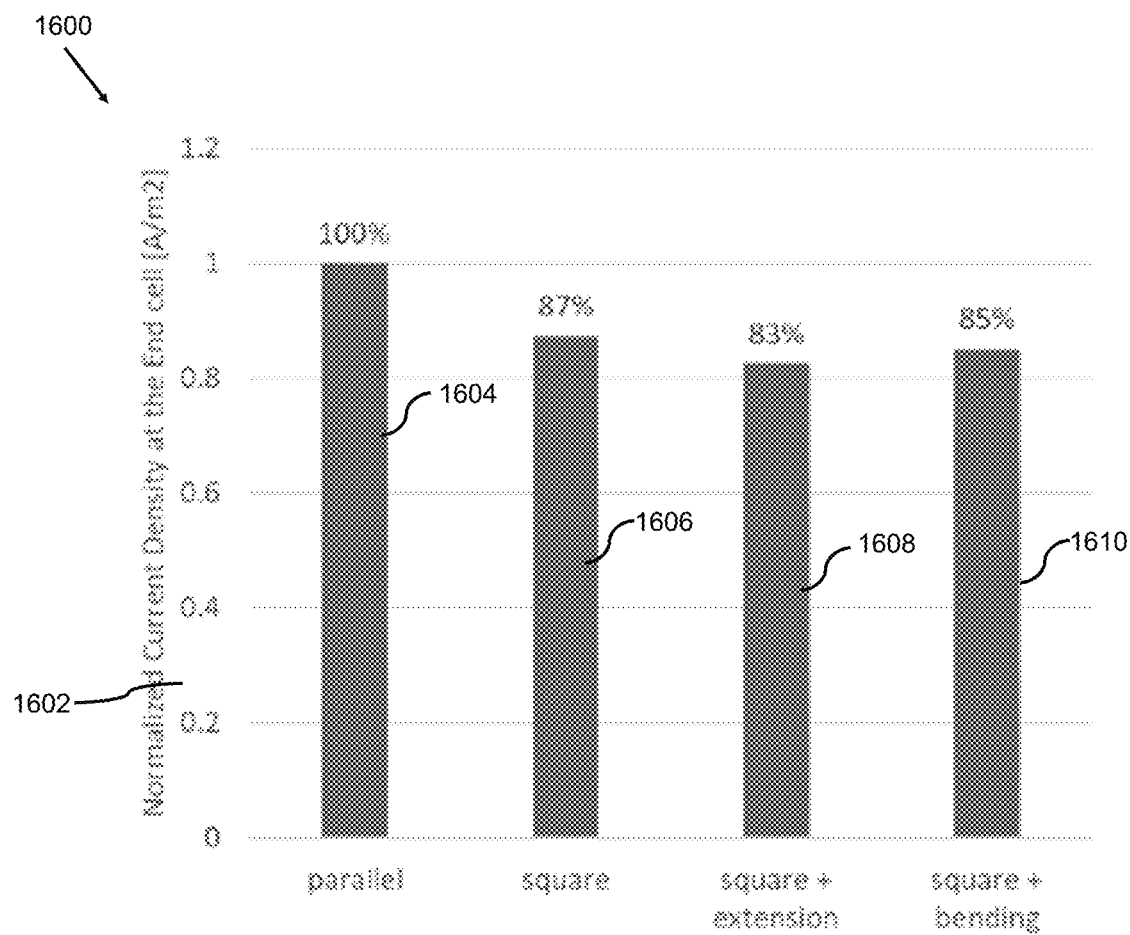
FIG. 16 illustrates a graph comparing normalized current density at the end of a cell in each of the fuel cells of FIGS. 15A-D.

FIG. 16 illustrates a graph 1600 comparing normalized current density at the end of a cell in each of the fuel cell systems of FIGS. 15A-D.

As shown in FIG. 16, graph 1600 includes a y-axis 1602, a bar 1604, a bar 1606, a bar 1608, and a bar 1610. Y-axis 1602 indicates normalized current density on the surface of the cathode that is near the seal (not shown) and is facing the anode, of the top most cell. Bar 1604 corresponds to the normalized current density of the related art fuel cell system as shown in FIG. 15A, bar 1606 corresponds to the normalized current density of the fuel cell system as shown in FIG. 15B, bar 1608 corresponds to the normalized current density the end of a cell of the fuel cell system as shown in FIG. 15C, and bar 1610 corresponds to the normalized current density the end of a cell of the fuel cell system as shown in FIG. 15D.

Figure 17:
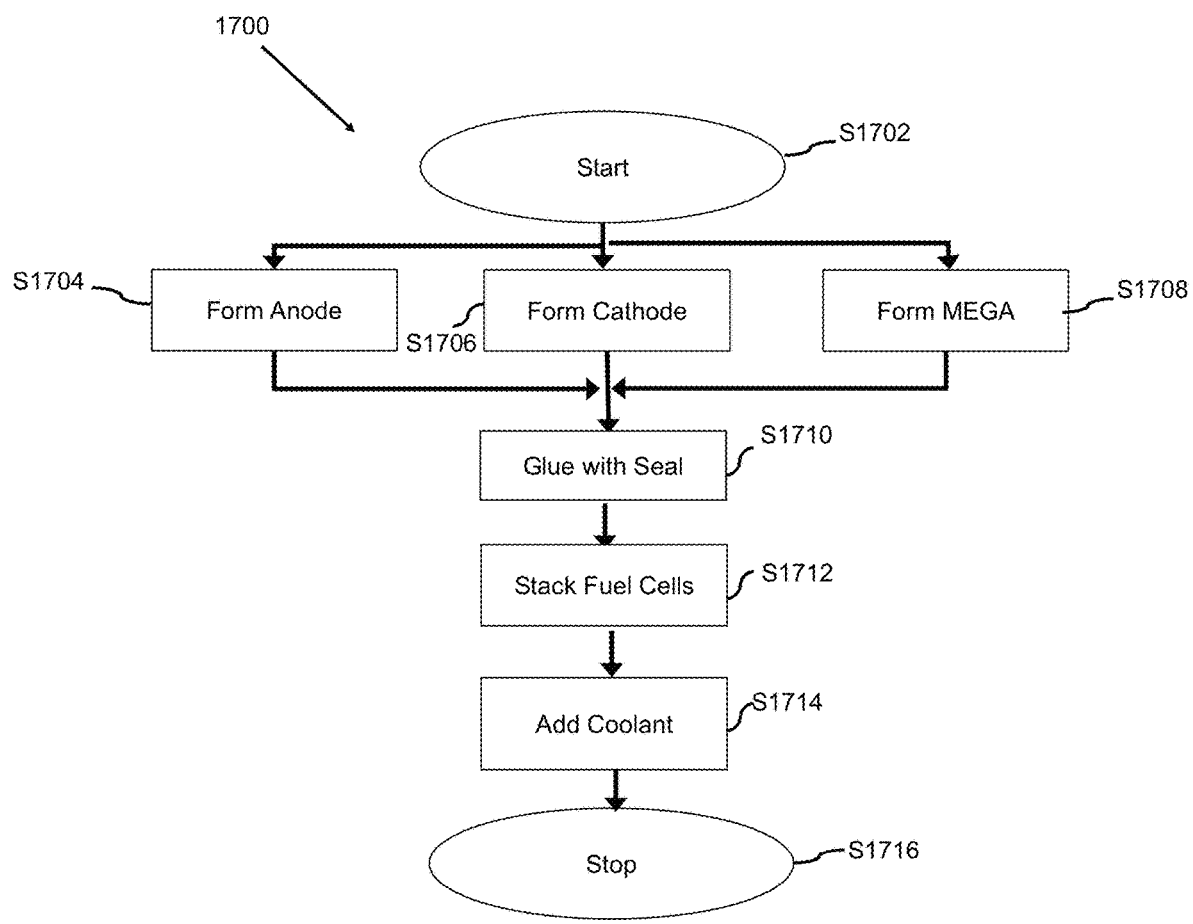
FIG. 17 illustrates a method of making a fuel cell system in accordance with aspects of the present disclosure.

FIG. 17 illustrates a method 1700 of making a fuel cell system in accordance with aspects of the present disclosure.

As shown in the figure, method 1700 starts (S1702) and an anode is formed (S1704), a cathode is formed (S1706) and the MEGA is formed (S1708). These parts may be formed by any known method. A non-limiting example method of forming an anode and cathode is by stamping, In accordance with aspects of the present disclosure, for example as discussed above with reference to FIGS. 7-8D, the end of the anode that will be exposed to the coolant might be stamped to have a predetermined shape.

After the anode is formed (S1704), the cathode is formed (S1706), and the MEGA is formed (S1708), they are glued together with a seal to form a fuel cell (S1710). This may be performed by any known method to separate the last fuel cell from the area in which the end of the anode will be exposed to the coolant.

After the fuel cells are formed (S1710), multiple formed fuel cells are stacked to from a fuel cell stack (S1712). This may be performed by any known method.

After the fuel cell stack is formed (S1712), coolant is added (S1714). For example, coolant may be input into the manifold and connected to a heat transfer system as discussed above with reference to FIG. 6.

After coolant is added (S1714), method 1700 stops (S1716).

It should be noted that fuel cell system in accordance with aspects of the present disclosure may be made using a different order of the processes discussed above with reference to FIG. 17.

A benefit of a fuel cell system in accordance with aspects of the present disclosure is that it requires no additional investment to improve the durability of the fuel cell stack. Because electrolytic corrosion ratio is proportional to the shunt current, the shape design of the electrode can be used for tuning current distributions and the reaction speed at a specific area of the plate. The designed shape can be fabricated at the same time as gas flow channels are formed in the bipolar plates via stamping. Therefore, no additional process is required.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to enable others skilled in the art to best utilize the invention in various embodiments and with various modifications as are suited to the particular use contemplated. It is intended that the scope of the invention be defined by the claims appended hereto.

What is claimed is:

1. A fuel cell system comprising:
   a first fuel cell;
   a second fuel cell electrically connected in series with said first fuel cell;
   a cathode configured to receive a positive charge from said first fuel cell and said second fuel cell;
   an anode disposed apart from said cathode and configured to receive a negative charge from said first fuel cell and said second fuel cell;
   a manifold enclosing said anode and said cathode;
   coolant disposed within said manifold and surrounding said cathode and said anode; and
   a seal disposed between said cathode and said anode so as to prevent said coolant from leaking into said first fuel cell,
   wherein said cathode includes a seal portion disposed adjacent to said seal and a remaining portion separated from said seal by said seal portion, and
   wherein said remaining portion of said cathode is configured to be non-parallel with said anode so as to reduce shunt current at said seal portion.

2. The fuel cell system of claim 1, wherein said remaining portion of said cathode includes a parallel portion that is parallel with said anode and a rising step portion that is not parallel with said anode.

3. The fuel cell system of claim 2,
   wherein said parallel portion is disposed a first distance from said anode and said rising step portion is disposed at a second distance from said anode,
   wherein said first distance is greater than said second distance, and
   wherein said rising step portion connects said parallel portion with said seal portion.

4. The fuel cell system of claim 1,
   wherein said remaining portion of said cathode is curved such that at least one portion of said remaining portion is disposed a first distance from said anode and said seal portion is disposed at a second distance from said anode, and
   wherein said first distance is less than said second distance.

5. The fuel cell system of claim 1,
   wherein said anode includes an anode seal portion disposed adjacent to said seal and an anode remaining portion separated from said seal by said anode seal portion, and
   wherein said remaining portion of said cathode is configured to be non-parallel with said anode remaining portion.

6. The fuel cell system of claim 1, wherein said remaining portion of said cathode includes an end that is bent toward said anode.

7. A method of making a fuel cell system, said method comprising:
   forming a first fuel cell;
   forming a second fuel cell electrically connected in series with the first fuel cell;
   forming a cathode configured to receive a positive charge from the first fuel cell and the second fuel cell;
   forming an anode disposed apart from the cathode and configured to receive a negative charge from the first fuel cell and the second fuel cell;
   forming a seal between the cathode and the anode;
   enclosing the anode and the cathode with a manifold; and
   disposing coolant within the manifold and so as to surround the cathode and the anode,
   wherein the seal prevents the coolant from leaking into the first fuel cell,
   wherein said forming the cathode comprises forming the cathode so as to include a seal portion disposed adjacent to the seal and a remaining portion separated from the seal by the seal portion, and
   wherein said forming the cathode comprises forming the remaining portion so as to be non-parallel with the anode so as to reduce shunt current at the seal portion.

8. The method of claim 7, wherein said forming the cathode comprises forming the remaining portion so as to include a parallel portion that is parallel with the anode and a rising step portion that is not parallel with the anode.

9. The method of claim 8,
   wherein said forming the remaining portion comprises forming the parallel portion so as to be disposed a first distance from the anode,
   wherein the rising step portion is disposed at a second distance from the anode,
   wherein the first distance is greater than the second distance, and wherein said forming the remaining portion comprises forming the rising step portion so as to connect the parallel portion with the seal portion.

10. The method of claim 7,
wherein said forming the cathode comprises forming the remaining portion to be curved such that at least one portion of the remaining portion is disposed a first distance from the anode,
wherein the seal portion is disposed at a second distance from said anode, and
wherein the first distance is less than the second distance.

11. The method of claim 7,
wherein said forming the anode comprises forming the anode so as to include an anode seal portion disposed adjacent to the seal and an anode remaining portion separated from the seal by the anode seal portion, and
wherein said forming the cathode comprises forming remaining portion so as to be non-parallel with the anode remaining portion.

12. The method of claim 7, wherein said forming the cathode comprises forming the remaining portion so as to include an end that is bent toward the anode.

13. A fuel cell system including a fuel cell, an anode, a cathode, a manifold surrounding said anode and said cathode, the improvement comprising:
wherein said cathode includes a seal portion and a remaining portion,
wherein said remaining portion of said cathode is configured to be non-parallel with said anode so as to reduce shunt current at said seal portion,
wherein said remaining portion of said cathode includes a parallel portion that is parallel with said anode and a rising step portion that is not parallel with said anode,
wherein said parallel portion is disposed a first distance from said anode and said rising step portion is disposed at a second distance from said anode,
wherein said first distance is greater than said second distance, and
wherein said rising step portion connects said parallel portion with said seal portion.

14. A fuel cell system including a fuel cell, an anode, a cathode, a manifold surrounding said anode and said cathode, the improvement comprising:
wherein said cathode includes a seal portion and a remaining portion,
wherein said remaining portion of said cathode is configured to be non-parallel with said anode so as to reduce shunt current at said seal portion,
wherein said remaining portion of said cathode is curved such that at least one portion of said remaining portion is disposed a first distance from said anode and said seal portion is disposed at a second distance from said anode, and
wherein said first distance is less than said second distance.

15. A fuel cell system including a fuel cell, an anode, a cathode, a manifold surrounding said anode and said cathode, the improvement comprising:
wherein said cathode includes a seal portion and a remaining portion,
wherein said remaining portion of said cathode is configured to be non-parallel with said anode so as to reduce shunt current at said seal portion,
wherein said anode includes an anode seal portion disposed adjacent to a seal and an anode remaining portion separated from said seal by said anode seal portion, and
wherein said remaining portion of said cathode is configured to be non-parallel with said anode remaining portion.

16. The fuel cell system of claim 13, wherein said remaining portion of said cathode includes an end that is bent toward said anode.

* * * * *